Oct. 24, 1944.    L. R. LUDWIG ET AL    2,361,221
AUTOMATICALLY RECLOSING CIRCUIT INTERRUPTER
Filed March 5, 1942
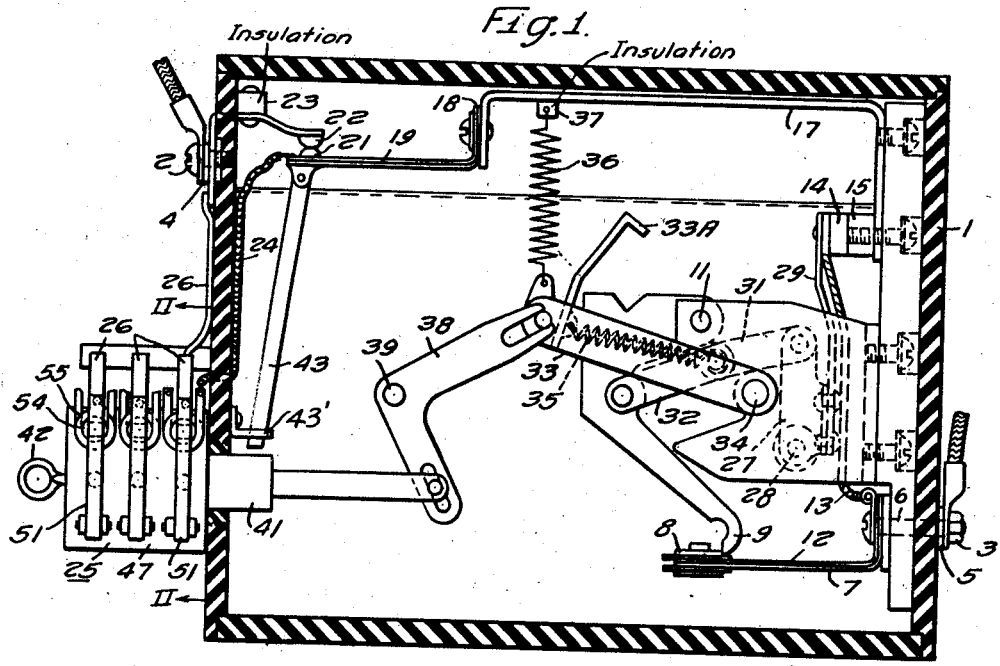
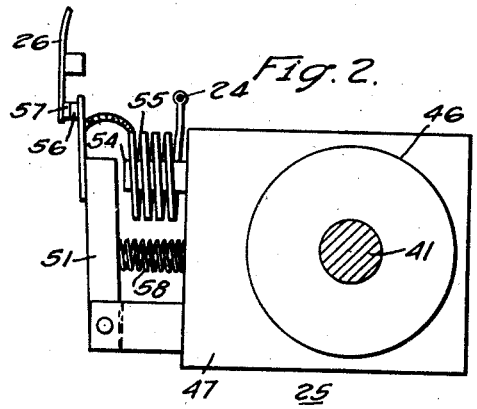
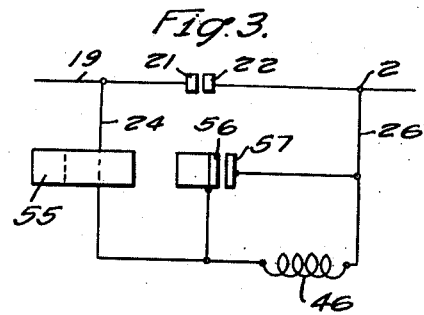
WITNESSES:
INVENTORS
Leon R Ludwig
and John W. May.
BY
ATTORNEY Patented Oct. 24, 1944

2,361,221

UNITED STATES PATENT OFFICE 2,361,221

AUTOMATICALLY RECLOSING CIRCUIT INTERRUPTER

Leon R. Ludwig, Wilkinsburg, Pa., and John W. May, Durham, N. C., assignors to Westinghouse Electric & Manufacturing Company, East Pittsburgh, Pa., a corporation of Pennsylvania Application March 5, 1942, Serial No. 433,472

4 Claims. (Cl. 175—294)

Our invention relates to circuit interrupters, and in particular relates to automatically reclosing circuit breakers.

For certain purposes such, for example, as rural electrification, it is desirable to have a circuit interrupter which will automatically open when excessive current flows through the line, and will then automatically reclose itself after a short interval, since in many cases the cause of the short circuit disappears within a time if the line is disconnected from a source of power. It is, however, impossible to be certain that the cause of the excessive current or short circuit will be removed merely by a brief removal of the line from connection to the voltage source, and in such cases it is desirable that the circuit breaker shall again automatically reopen this circuit as soon as the load current reaches an excessive value. In some instances, a second or a third interruption of the connection between the line and the voltage source will be followed by a disappearance of the condition causing excessive current flow, but there are occasional situations in which excessive current will flow even after a considerable number of reclosures of the circuit breaker connecting the line to the voltage source. Such a repeated opening and reclosure of the circuit interrupter will quickly overheat and ruin the latter, and it is, accordingly, desirable to provide an arrangement by which the circuit breaker shall remain open if the cause of excessive current does not disappear after a few automatic reclosures.

Our invention relates to a novel arrangement for thus opening and reclosing a circuit breaker when the line carries excessive current, but will carry out this operation for only a limited number of reclosures and thereafter maintain the circuit breaker open permanently until it is manually reclosed by a power-line attendant. It is an improvement upon the circuit interrupter shown in John W. May's application Serial No. 423,631, filed on or about December 19, 1941, for Automatically reclosing circuit interrupters, assigned to the Westinghouse Electric & Manufacturing Company of East Pittsburgh, Pennsylvania.

Circuit interrupters for carrying out the above-mentioned function have been devised before, but there are certain special conditions characteristic of rural electrification and other similar fields which make prior art circuit breakers unsatisfactory; for example, by reason of their excessive cost compared with the service they are expected to render, or their mechanical complexity or their liability to require constant inspection and repair or their short life in service. The device which we have invented avoids such difficulties as have just been enumerated, inasmuch as it has a relatively low first cost, has no complicated gear train escapements, ratchets or similar complex mechanisms, has few moving parts likely to get out of order, and is adapted to employ standard circuit interrupters which have been developed for non-reclosing circuits and which are now marketed in large numbers at very low cost and with high reliability.

One object of our invention, accordingly, is to provide a circuit interrupter which shall reclose automatically, but for only a limited number of times, and shall then remain open circuited.

Another object of our invention is to provide an arrangement of the type mentioned in the preceding paragraph which shall employ for its circuit interrupting function mechanisms which have been developed and successfully used for non-reclosing circuit breaker service.

Still another object of our invention is to provide a circuit interrupter of the type mentioned under the first paragraph naming the objects of our invention which shall be inexpensive to manufacture, and which shall employ a minimum of moving parts and other mechanical adjuncts.

Still another object of our invention is to provide an arrangement of the type mentioned in the first paragraph naming the objects of our invention which shall employ two differently rated bimetallic or thermostatic elements for controlling the tripping and reclosing cycles of the circuit breaker.

Still another object of our invention is to provide an arrangement mentioned in the immediately preceding paragraph in which is embodied a tripping coil which is traversed by substantial current only for a period at each tripping operation, and is normally substantially free from load current traverse.

Still another object of our invention is to provide an arrangement of the type mentioned in the first paragraph naming the objects of our invention in which the arrangement controlling the opening and reclosing cycle has an inverse time-current characteristic and can be altered as to rating very simply by replacement of only two relatively inexpensive and simple bimetallic elements of the device.

Still another object of our invention is to provide an improved arrangement for energizing a solenoid for opening or closing a circuit interrupter, or like service, in response to current flow in the line.

A further object of our invention is to provide a construction for such a solenoid adapted for energization by currents of large amperage.

Other objects of our invention will become apparent upon reading the following description taken in connection with the drawing, in which:

Figure 1 is a view partly in elevation and partly in section of a circuit interrupter embodying the principles of our invention;

Fig. 2 is an enlarged sectional view in the direction II—II of the opening solenoid structure shown in Fig. 1; and Fig. 3 is a schematic diagram of connections of the opening solenoid circuit.

Referring in detail to the drawing, the circuit interrupter is preferably contained within an enclosure or tank 1 which may be of insulating material or may be of suitable metal. Line terminals for the circuit controlled by the circuit interrupter are mounted at 2 and 3 on the casing 1, each line being preferably insulated from the casing if the latter is of metal by washers 4, 5. The terminal 3 is connected by a through-bolt 6, insulated from the casing 1 if the latter is of metal, with one layer 7 of a thermostatic bimetal which carries on its free end the holding element 8 of a latch, the other element 9 of which revolves about a stationary pivot 11 and constitutes the "trip-free arm" of the so-called "trip-free mechanism" of a circuit breaker actuating arrangement such as that shown in Patent 2,044,157, issued June 16, 1936 to H. D. Dorfman et al., and assigned to Westinghouse Electric & Manufacturing Company, the assignee of our instant application. The layer 12 associated with the above-mentioned layer 7 to constitute a bimetallic thermostatic element is insulated from the layer 7, except at the free end of the bimetal, as a result of which current flowing from the terminal 3 traverses the layer 7 to its free end and then flows back through the layer 12 to the flexible lead 13 which conducts current to the moving contact 14 of the circuit breaker mechanism illustrated in the above-mentioned patent. The stationary contact 15 of the circuit breaker mechanism is mounted on circuit breaker base plate of insulating material and current flows thence through the strap 17 to the fixed end 18 of a second bimetallic thermostatic element 19. Current then flows through the second thermostatic element to the free end thereof, thence flowing through a contact button 21 to a second contact button 22 which is normally in contact with the button 21 in the undeflected condition of the bimetallic element now under discussion.

The contact button 22 is mounted in a fixed position on an insulating block 23 which is supported from the wall of the enclosure 1. A flexible lead 24 extends from the contact button 21 to one terminal of a solenoid energizing arrangement which is mounted on the casing 1 and which is shown in more detail in Figs. 2 and 3 and described fully below. The other terminal of this solenoid arrangement is connected through a lead 26 with the terminal 2. The contact button 22 is also connected by a suitable lead passing through the wall of the container 1 to the terminal 2.

The operating mechanism for the movable contact 14 comprises a lever 27 having a stationary pivot 28 and attached to the resilient arm 29 which supports the contact 14. Pivoted to the lever 27 is a link 31 which is, in turn, pivoted to one end of a link 32 of which the other end is pivoted upon the arm 9. The links 31 and 32 constitute a toggle arranged for stability in the position shown in the drawing, in which the movable contact 14 is pressed into firm engagement with the stationary contact 15.

A handle 33 having a stationary pivot 34 is connected to the knee of the toggle 31, 32 by a spring 35 which in the position shown in the drawing exerts a force on the knee of the toggle 31, 32 to hold it in the position shown, thereby stressing the contacts 14, 15 to closed circuit position. The handle 33 may, however, be turned counterclockwise about the pivot 34 thereby displacing the upper end of the spring 35 downward in the drawing to such a degree as to pull the knee of the toggle 31, 32 likewise downward, thereby breaking the toggle and pulling the movable contact 14 away from the stationary contact 15. The free end of the handle 33 is biased in a clockwise direction in the drawing by a spring 36 which is attached to an insulating projection 37 attached to the strap 17. The handle 33 carries an arm 33A adapted to engage the trip-free arm 9 under certain conditions later to be explained. In a multipole circuit breaker each pole comprises the elements so far enumerated.

The handle 33 is adapted to be moved from its closed circuit position, as shown in the drawing, and against the bias of the spring 35 by a bell crank lever 38 pivoted at 39 to the container 1. In a multipole breaker the arms 33 of the respective poles are mechanically linked to move in unison. The bell crank lever 38 is moved clockwise from the position shown in the drawing by a magnetic core 41 which slides through the axis of the solenoid arrangement above mentioned. The core 41 is provided with a handle 42 by which it may be moved manually. There is provided a rod 43 which slides through a guide 43' and has its end pivoted to bimetal 19. When the latter is heat-deflected by being traversed by overload current, it moves the end of the rod 43 downward into latching engagement with core 41 for a purpose to be described below. A single bell-crank lever 38 and core 41 suffice even for a multipole breaker.

The solenoid arrangement mentioned above is shown in elevation in Fig. 1 at 25, and Fig. 2 shows a view along the plane II—II of Fig. 1. The main solenoid encloses and attracts the core 41 and consists of one winding 46 for each pole of the circuit interrupter. The windings are mounted on an iron magnetic circuit 47 which may be of the shell type well known in the solenoid art. Mounted on one side of this magnetic circuit 47 is a series of hinged armatures 51, one for each pole of the circuit breaker (a three-pole breaker being shown as an example) each armature cooperating with a magnetic circuit comprising a pole piece 54 and a portion of the above-mentioned magnetic circuit 47. There is a projecting pole piece 54 for each pole of the circuit breaker, and each such pole piece is surrounded by an auxiliary solenoid 55 which is connected to the lead 24, already described, corresponding to the associated pole of the circuit breaker. Each of the armatures 51 carries a movable contact 56, which is biased into engagement with a stationary contact 57 by a spring 58. The stationary contact 57 is connected through the lead 26, already described, to the line terminal 2. The solenoid winding 46, corresponding to the associated pole of the circuit breaker, is connected in shunt across the contacts 56, 57.

The diagram in Fig. 3 shows schematically the connections of the solenoid arrangement just described. When normal current flows through the circuit breaker, the bimetal 19 remains deflected to such a small extent that contacts 21 and 22 are closed and contacts 56 and 57 are retained in closed position by the spring 58. The main line current, accordingly, divides between the contacts 21, 22 as one path and a path comprising the solenoid 55 and the contacts 56, 57. The strength of the spring 58 is adjusted to such a value that the fraction of the current flowing through the solenoid 55 is insufficient to move the armature 51. If now the current through the circuit breaker rises to a value higher than normal, the bimetal 19 is soon deflected sufficiently to open the contacts 21, 22, thereby sending the entire line current through the solenoid 55 and the closed contacts 56, 57. The spring 58 is so adjusted that with full load current flowing thus through the solenoid 55, contacts 56, 57 are opened, thereby sending the entire line current through the main solenoid winding 46, so attracting the core 41.

The mode of operation of our above described circuit interrupter is as follows: Assuming the mechanism to be in the position shown in the drawing, the contacts 14, 15 will remain in their indicated closed-circuit position until sufficient current flows through the bimetal 19 to separate the contacts 21, 22 whereupon the solenoid arrangement will attract core 41 as already described. The core 41 will be drawn inward, thereby rotating the bell crank lever 38 in a clockwise direction, displacing the handle 33 in a counterclockwise direction against the bias of spring 36 and causing the spring 35 to exert a pull upon the toggle 31, 32 to break the latter, thereby separating the contacts 14, 15 and opening the circuit. The bimetal 7, 12 will, of course, be heated by this same current but is so proportioned that it is not sufficiently heated to be substantially displaced from the position indicated in the drawing by the time the bimetal 19 has moved to open the contact 21, 22. Opening of the main contacts 14, 15 of course cuts off current flow through bimetal 19, solenoid 55 and solenoid 46 thus returning the solenoid arrangement to its initial deenergized condition.

The core 41 will remain latched by the rod 43, thus holding the handle 33 in the open-circuit position against the bias of the spring 36, until such time as the bimetal 19 has had time to cool and close the contacts 21, 22. As soon as the contacts 21, 22 close, the rod 43 disengages core 41 and the spring 36 can pull the circuit breaker handle 33 together with its attendant bell crank lever 38 and core 41 to the closed circuit position shown in the drawing. The contacts 14 and 15 are thus again closed.

If during the open-circuit interval just described, the cause of the flow of excessive current through the circuit breaker has been removed, the circuit breaker will remain in its closed-circuit position. However, if the line is in such a condition that an excessive current still flows through the bimetal 19, the latter will be heated sufficiently to open the contacts 21, 22, thereby reenergizing solenoid arrangement 25 to again pull the handle 33 to the open circuit position against the bias of spring 36. The bimetal 7, 12 is so designed that it is more massive than the bimetal 19, and hence does not lose such heat as was previously stored in it at the time the circuit breaker was first opened. The bimetal 7, 12 is, therefore, again heated and caused to store more heat while the circuit breaker remains closed for the short time required to heat the bimetal 19 enough to open contacts 21, 22. The bimetal 7, 12 is, however, so designed that even after this second heating, it is not deflected far enough to disengage the latch member 8 from the trip free arm 9.

Cessation of current flow through the circuit breaker due to the opening of contacts 14, 15 for the second time again permits the bimetal 19 to cool, thereby disengaging latch 43 from core 41 so that the spring 36 can again move the circuit breaker to its closed circuit position. If the cause for excessive current-flow in the line has disappeared during this second open circuit interval, the circuit breaker will remain closed. On the other hand, if the cause of excessive current in the line still persists, the bimetal 7, 12 is so designed that the additional heating due to the flow of this excessive current for the third time will deflect its upper end to disengage the latch member 8 from the arm 9. When this happens, the spring 35 exerts such an upward pull on the knee of the toggle 31, 32 as to move the member 9 clockwise about the stationary pivot 11, thereby permitting the arm 27 to rotate about its pivot 28 to open the contacts 14, 15. This clockwise movement of member 9 is arrested when it engages arm 33A. The circuit breaker will thereafter remain in its open circuit position regardless of the cooling of the bimetal 7, 12 and the bimetal 19 until an attendant manually moves the handle 42 to actuate handle 33 to open circuit position through the agency of bell-crank lever 38. When this happens arm 33A engages and moves trip free arm 9 counterclockwise about its pivot 11 into latching engagement with the latch member 8. Thereafter, the spring 36 is able to move the arm 33, the toggle 31, 32 and the contacts 14, 15 to their closed circuit position again as soon as the attendant releases handle 42.

It will be recognized that by properly proportioning the heat-storage and other properties of bimetals 7, 12 and 19 the number of openings of the circuit-breaker by bimetal 19 which intervene before bimetal 7, 12 unlatches the trip-free arm 9 can be fixed at will.

While we have shown the bimetal 19 as positioned above the surface of the oil and the bimetal 7, 12 below the surface of the oil, it will be recognized that it may, under certain circumstances, be desirable to locate the bimetal 19 likewise below the surface of the oil in the container 1. While we have shown a particular mechanism for moving the contacts 14, 15 to closed-circuit and open-circuit position, it will be recognized that the principles of our invention are by no means limited to the use of this particular mechanism in combination with the bimetal 7, 12 and 19. Any circuit breaker arrangements in which a motor means energized by one bimetal moves to open-circuit position a circuit breaker biased to closed-circuit position, and in which a predetermined amplitude of movement of a second bimetal serves to permit the exertion of forces able to open the circuit breaker against any closed-circuit bias acting thereon are within the purview of our invention. The arrangement in which the second bimetal releases the trip-free arm of a toggle mechanism is, however, a very convenient and advantageous form of our invention, which may be used with numerous types of circuit breaker mechanism otherwise dissimilar to the specific form shown in the Dorfman et al. Patent 2,044,157.

Many forms of circuit breaker mechanism having trip-free arm-latches are known, and the control of the trip-free arm-latch by means of a bimetal which is only moved sufficiently to unlatch the arm after several successive trippings of the circuit breaker within a predetermined limited interval of time are within the purview of our invention.

We claim as our invention:

1. In combination with a circuit interrupter having its separable contacts normally biased to closed circuit position, a first pair of auxiliary contacts, means to open said auxiliary contacts in response to overload current through said separable contacts, a magnetic core arranged when moved to actuate said separable contacts to the open-circuit position, a solenoid winding provided with means for energizing it and positioned when energized to move said core to open said separable contacts, a second pair of auxiliary contacts for controlling the energization of said solenoid, an auxiliary solenoid connected in shunt with said first pair of auxiliary contacts, and means for causing energization of said auxiliary solenoid to actuate said second pair of auxiliary contacts after said first pair of auxiliary contacts have been operated.

2. In combination with a circuit interrupter having its separable contacts normally biased to closed circuit position, a first pair of auxiliary contacts, means to open said auxiliary contacts in response to overload current through said separable contacts, a magnetic core arranged when moved to actuate said separable contacts to the open-circuit position, a solenoid winding provided with means for energizing it and positioned when energized to move said core to open said separable contacts, means including a second pair of auxiliary contacts connected in a shunt circuit which when closed deenergizes said solenoid, an auxiliary solenoid connected in shunt with said first pair of auxiliary contacts, a magnetic circuit for the first-mentioned solenoid, a movable armature and pole piece mounted on said magnetic circuit, said pole piece being arranged to be magnetized by current flow in said auxiliary solenoid, one member of said second pair of auxiliary contacts being mounted on said armature and moved to open position when said armature is attracted by energization of said auxiliary solenoid after said first pair of auxiliary contacts have been operated.

3. In combination with a circuit interrupter having its separable contacts normally biased to closed-circuit position, a first pair of auxiliary contacts connected to a bimetal traversed by the current through said separable contacts and arranged to be opened when said bimetal is heated to a predetermined temperature, a magnetic core arranged when moving to actuate said separable contacts to the open-circuit position, a solenoid winding provided with means for energizing it and positioned when energized to move said core to open said separable contacts, means including a second pair of auxiliary contacts connected in a shunt circuit which when closed deenergizes said solenoid, an auxiliary solenoid connected in shunt with said first pair of auxiliary contacts, and means for causing energization of said auxiliary solenoid to open said second pair of auxiliary contacts after said first pair of auxiliary contacts have been operated.

4. In combination with a circuit interrupter having its separable contacts normally biased to closed-circuit position, a first pair of auxiliary contacts connected to a bimetal traversed by the current through said separable contacts and arranged to be opened when said bimetal is heated to a predetermined temperature, a magnetic core arranged when moved to actuate said separable contacts to the open-circuit position, a solenoid winding provided with means for energizing it and positioned when energized to move said core to open said separable contacts, means including a second pair of auxiliary contacts connected in a shunt circuit which when closed deenergizes said solenoid, an auxiliary solenoid connected in shunt with said first pair of auxiliary contacts, a magnetic circuit for the first-mentioned solenoid, a movable armature and pole piece mounted on said magnetic circuit, said pole piece being arranged to be magnetized by current flow in said auxiliary solenoid, one member of said second pair of auxiliary contacts being mounted on said armature and moved to open position when said armature is attracted by energization of said auxiliary solenoid after said first pair of auxiliary contacts have been operated.

LEON R. LUDWIG.
JOHN W. MAY.